March 21, 1939. B. E. FOLKE 2,151,657
VALVE
Filed Jan. 17, 1938 2 Sheets-Sheet 1

BENGT E. FOLKE
INVENTOR

ATTORNEY

March 21, 1939.   B. E. FOLKE   2,151,657

VALVE

Filed Jan. 17, 1938   2 Sheets-Sheet 2

BENGT E. FOLKE
INVENTOR

BY Walter E. Wilhelm
ATTORNEY

Patented Mar. 21, 1939

2,151,657

UNITED STATES PATENT OFFICE 2,151,657

VALVE

Bengt E. Folke, Mamaroneck, N. Y., assignor to Nathan Manufacturing Company, New York, N. Y., a corporation of New York Application January 17, 1938, Serial No. 185,307

2 Claims. (Cl. 277—36)

This invention relates to quick-opening steam valves of the kind used, for instance, in connection with locomotive injectors.

It is the principal object of the invention to provide a valve of this description which is better suited for operation by high pressure steam than valves used heretofore.

Another object is to provide a valve which can be opened without undue effort on the part of the operator.

A further object is to provide a structure which can easily be kept tight.

A still further object is to provide a valve which can easily be maintained and restored to its original condition with the least expense.

Other objects and advantages will become apparent in the following specification and accompanying drawings in which Fig. 1 shows a valve embodying a preferred form of the principles of the invention as applied to a locomotive injector and mounted upon a locomotive, the latter being shown fragmentarily and diagrammatically only;

Like characters of reference denote similar parts throughout the several views and the following specification.

Figure 1:
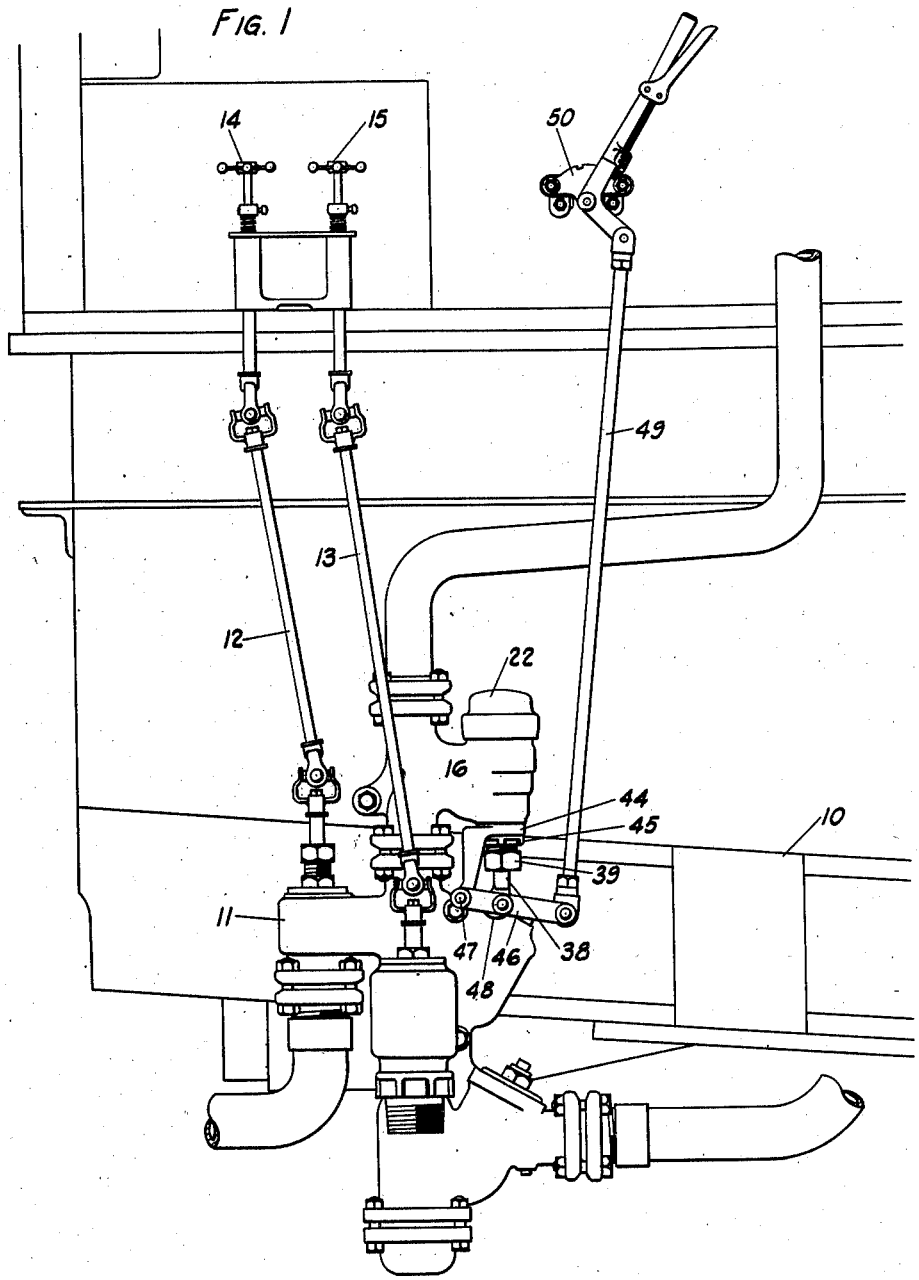

In Fig. 1 is shown diagrammatically a fragmentary part of a frame 10 of a locomotive, having mounted thereon an injector 11. 12 and 13 are, respectively, water valve and overflow valve handle rods, operable by hand wheels 14 and 15, in the manner well known in the art. Connected to the steam end of the injector is a valve 16, details of which are shown in Figs. 2 to 6.

Figure 2:
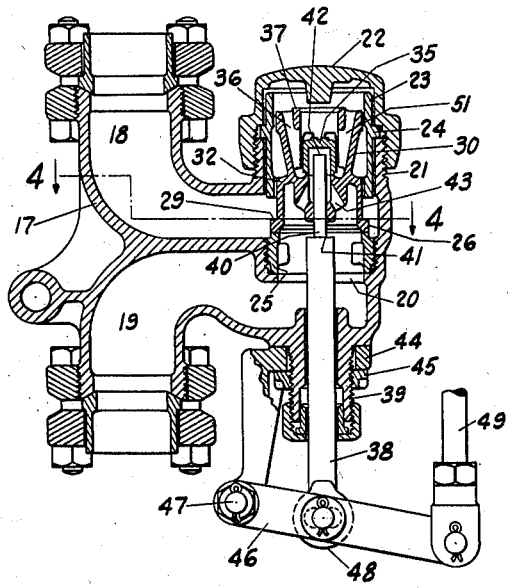
Fig. 2 is an enlarged vertical sectional view of the valve proper shown in a closed position and in a larger scale.
Figure 3:
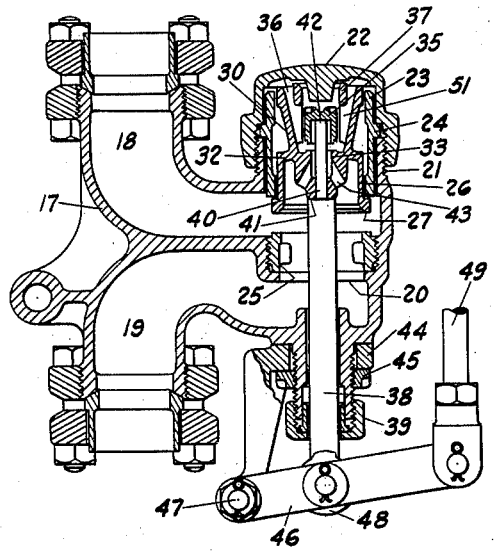
Fig. 3 is a similar sectional view of the valve shown in an open position.
Figure 4:
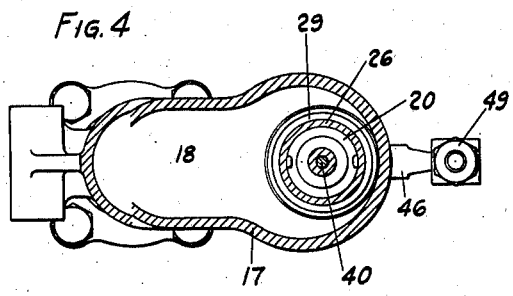
Fig. 4 is a horizontal sectional view taken along the plane of line 4—4 in Fig. 2.
Figure 5:
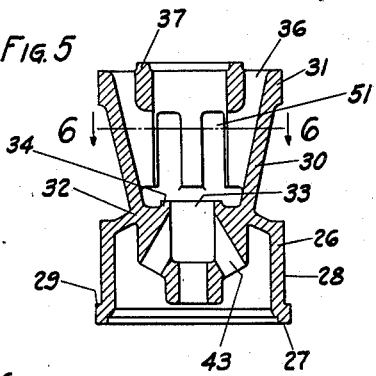
Fig. 5 is an enlarged sectional view of the main valve member.
Figure 6:
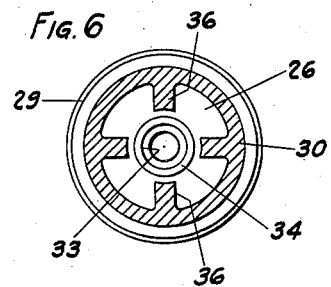
Fig. 6 is a horizontal sectional view taken along the line 6—6 in Fig. 5.

Referring now particularly to Fig. 2, where the valve is shown in a closed position, 17 is a valve casing of substantially T-shape having an inlet passage 18 and an outlet passage 19 and a valve opening 20 connecting these passages. In axial alignment with the opening 20, casing 17 has a threaded cylindrical extension 21 closed by a cap 22 which firmly holds a sleeve 23 of wear-resisting metal to the body by clamping an annular flange 24 of the sleeve against the end of extension 21.

A main valve seat 25 is screwed into the valve casing immediately above its opening 20. 26 is a main valve member having a seat portion 27 resting upon the valve seat 25, and a smaller cylindrical portion 28 above its seat portion 27, but somewhat smaller in diameter, leaving an annular shoulder 29. The upper part of the portion 28 is slidably guided within sleeve 23. The top of the main valve member 26 is substantially cup-shaped at 30 having its upper rim 31 also slidably guided within sleeve 23, thus forming an annular expansion chamber defined by the inner surface of the sleeve 23 and the outer surface of wall 30, the cylindrical portion 28 and the upper rim 31 of the main valve 26 where it is guided in the sleeve. The member 26 has a partition 32 about centrally within it provided with an auxiliary or pilot valve opening 33 and a valve seat 34 surrounding it, see Fig. 5.

Adapted to be seated upon seat 34 is an auxiliary or pilot valve 35 of substantially inverted cup-shape which is guided by ribs 36 in the upper part of the main valve member 26. 37 is a cylindrical connector for the top of the ribs and which is also adapted to limit the travel of the valve member 26 by contacting with the inner part of cap 22.

38 is a valve stem projecting through the bottom of the valve casing where a suitable stuffing box 39 is provided. Stem 38 has an end 40 reduced in diameter forming an annular shoulder 41 with the main part of the stem. This smaller round end 40 of the stem slidably engages and projects through a central opening within the partition 32 of the main valve and extends to within the cup-shaped pilot valve 35 which it is adapted to contact with its end face 42. 43 are obliquely disposed passages through partition 32 below its seat 34.

Externally of the casing, and at its bottom, is a bracket 44 held thereto by a lock nut 45. 46 is a fulcrum lever connected to a fulcrum 47 and to a slotted end 48 of the valve stem 38 and further to an operating rod 49, as shown in Fig. 1. Operating rod 49 is connected to a latch and trigger handle of the usual type which is supported in the cab of the locomotive upon a bracket 50.

The operation of the valve is as follows:

Referring to Fig. 2, it is noted that the main valve 26 and the pilot valve 35 are closed. Steam, under pressure, entering through inlet passage 18 is thus prevented from passing into outlet passage 19, but is free to pass through the restricted clearance area between valve 26 and sleeve 23 into a balance chamber 51. The pressure in this chamber holds the main valve 26 and the pilot valve 35 firmly to their seats. Steam passing through the clearance area around the part 28 of the main valve expands in the expansion chamber immediately above it, causing a pressure drop. It then passes through the clearance area around the upper rim 31 into the much larger balance chamber 51 at a pressure still lower than that in the expansion chamber. Thus the pressure drop in the steam while travelling from the inlet passage, through the expansion chamber, into the balance chamber is greater than were only a single restricted passage provided for without any expansion chamber. Because of this greater pressure drop reasonable wear of the restricted passages will have less harmful effect tending to unbalance the main valve for the reason that the steam admitted into the balance chamber at lower pressure can more readily be passed through the pilot valve opening than steam at higher pressure and corresponding larger volume discharge and thus offers less resistance to the opening of the main valve. The valve, therefore, being less sensitive to normal wear in the restricted passages which also serve as guides for the main valve, has a considerably longer service life than valves without the characteristics just mentioned.

To open the valve, stem 38 is pushed upwardly until the face 42 of its top extension 40 contacts the underside of pilot valve 35 which is then raised from its seat by a small additional movement of the stem. After the pilot valve is thus opened, the steam in chamber 51 passes through the opening between the bottom of the pilot valve 35 and its seat 34 and through the obliquely disposed passages 43 into the outlet passage 19. The area through the pilot valve opening 33 and the combined area of the passages 43 are, respectively substantially greater than the restricted clearance area between the outside of the main valve 26 and the inside of sleeve 23, resulting in full equalization of pressures on top and bottom of the main valve. The shoulder 29 is provided for on the main valve so that, while it is now nearly balanced, it is still held to its seat by the slight pressure acting on the annular area of shoulder 29.

It is often advantageous to admit a small amount of steam through the pilot valve for the purpose of heating the water in the tender of the locomotive through the injector, and at such times the pressure on the area of the shoulder 29 prevents the main valve 26 from chattering and injuring the valve seat 25.

As the main valve stem 38 is moved further upwardly until its shoulder 41 contacts the main valve 26, only a slight additional force on the stem is necessary to overcome the resistance of the steam against the shoulder 29, and the main valve may be opened to permit steam to flow freely and under full pressure from the inlet passage 18 into the outlet passage 19.

In the closed position, the valve stem 38 is not subjected to pressure. This is important inasmuch as the stuffing box is relieved of pressure when the valve is closed. The only force necessary to open the valve is therefore, initially the pressure on top of the pilot valve, and then after the pilot valve has been opened, the pressure on the annular shoulder 29 of the main valve. It is to be noted, however, that as soon as the main valve is lifted from its seat, pressure will immediately be built up in the outlet passage of the valve around the valve stem. At this movement therefore and as the valves are lifted into their open position, therewill be a preponderance of pressure on top of the valves proportional to the area of the large diameter of the valve stem, and this will have a tendency to retard the upward movement of the valve stem. The result is that a uniform force is required to lift the valve, permitting slow and gradual opening and eliminating any tendency for jerking at that time.

While I have shown and described a valve embodying the principles of the invention in connection with a locomotive injector and for starting the same, it is obvious that the valve may be used for other purposes as well.

It is understood that various changes in the form, proportions, minor details and combination of parts may be resorted to without departing from the principles or sacrificing any of the advantages of the invention, as defined in the appended claims.

What I claim as new, is:

1. In a valve structure, a casing having an inlet passage, an outlet passage and a main valve opening therebetween, a guide sleeve in the casing projecting into the inlet passage, a main valve slidably disposed within the guide sleeve and being adapted to close the said opening, a cap in alignment with the said sleeve and main valve for inserting the sleeve and main valve into and closing the casing, the said valve having walls slidably engaging the top and bottom of the said sleeve forming a balance chamber with the said sleeve and cap and having a pilot valve opening in its center, a pilot valve loosely disposed within the said balance chamber and independently of the said main valve adapted to close the said pilot valve opening, the said balance chamber having a restricted inlet of less area than the said pilot valve opening, and a valve stem independent of the said pilot valve adapted to contact with its end the said pilot valve to open the same and having a shoulder adapted to contact the said main valve to lift the main valve off its seat after the said pilot valve has been opened, the said pilot valve being removable from the said casing upon removal of the said cap.

2. In a valve structure, a casing having an inlet passage, an outlet passage and a main valve opening therebetween, a guide sleeve in the casing projecting into the inlet passage, a main valve slidably disposed within the guide sleeve and being adapted to close the said opening, a cap in alignment with the said sleeve and main valve for inserting the sleeve and main valve into and closing the casing, the said valve having walls slidably engaging the said sleeve forming a balance chamber with the said sleeve and cap and having a pilot valve opening in its center, a pilot valve loosely disposed within the said balance chamber and independently of the said main valve adapted to close the said pilot valve opening, means to step down gradually the pressure drop of the steam from the said inlet passage to the said balance chamber including an expansion chamber having a restricted inlet and outlet defined by the said sleeve and walls of the said main valve, and a valve stem independent of the said pilot valve adapted to contact with its end the said pilot valve to open the same and having a shoulder adapted to contact the said main valve to lift the main valve off its seat after the said pilot valve has been opened, the said pilot valve being removable from the said casing upon removal of the said cap.

BENGT E. FOLKE.